United States Patent
Bennett et al.

(10) Patent No.: US 8,620,890 B2
(45) Date of Patent: Dec. 31, 2013

(54) SYSTEM AND METHOD OF SEMANTIC BASED SEARCHING

(75) Inventors: Susan Bennett, Overland Park, KS (US); Mihwa Cha, Overland Park, KS (US)

(73) Assignee: Accelerated Vision Group LLC, Overland Park, KS (US)

( * ) Notice: Subject to any disclaimer, the term of this patent is extended or adjusted under 35 U.S.C. 154(b) by 3 days.

(21) Appl. No.: 13/164,754

(22) Filed: Jun. 20, 2011

(65) Prior Publication Data

US 2011/0314032 A1   Dec. 22, 2011

Related U.S. Application Data

(60) Provisional application No. 61/356,444, filed on Jun. 18, 2010.

(51) Int. Cl.
*G06F 7/00* (2006.01)
*G06F 17/00* (2006.01)

(52) U.S. Cl.
USPC ........... 707/705; 707/736; 707/749; 707/758; 704/1; 704/9; 704/10

(58) Field of Classification Search
USPC ........... 707/705, 736, 749, 758, 999.3; 704/1, 704/9, 10
See application file for complete search history.

(56) References Cited

U.S. PATENT DOCUMENTS

| | | |
|---|---|---|
| 3,933,895 A | 1/1976 | Nelson |
| 6,101,492 A | 8/2000 | Jacquemin |
| 6,161,084 A | 12/2000 | Messerly |
| 6,167,370 A | 12/2000 | Tsourikov |
| 6,246,977 B1 | 6/2001 | Messerly |
| 6,453,315 B1 | 9/2002 | Weissman |
| 6,823,325 B1 * | 11/2004 | Davies et al. ............ 706/50 |
| 7,120,574 B2 | 10/2006 | Troyanova |
| 7,251,781 B2 | 7/2007 | Batchilo |
| 7,478,090 B2 | 1/2009 | Aparicio, IV |
| 7,478,192 B2 | 1/2009 | Fleming |
| 7,536,368 B2 | 5/2009 | Todhunter |
| 7,558,778 B2 | 7/2009 | Carus |
| 7,565,491 B2 | 7/2009 | Lemen |
| 7,689,410 B2 | 3/2010 | Chang |

(Continued)

OTHER PUBLICATIONS

International Search Report (ISR) and Written Opinion (WO) of International Search Authority (ISA) for related PCT/US2011/041130, mailed Dec. 1, 2011.

(Continued)

*Primary Examiner* — Hares Jami
(74) *Attorney, Agent, or Firm* — Kutak Rock LLP; Bryan P. Stanley

(57) ABSTRACT

A computer-implemented method is provided for searching documents containing complex bodies of knowledge, such as patents and research papers. The computer-implemented method and related hardware and software provides methodology to interpret the intent of the searcher (the meaning of the searcher's query) into a MetaLanguage, including but not limited to the use of Fundamental Nature Attributes, Fundamental Action Attributes and Weighting of these attributes as it pertains to the intent of the searcher. The invention relates to semantic based searches. The same methodology that is used on the searcher's query is also used to mine and store the existing databases of patents and research papers into databases of MetaLanguage for the purpose of producing search results that better match search inquiries.

32 Claims, 7 Drawing Sheets

(56) References Cited

U.S. PATENT DOCUMENTS

| | | | |
|---|---|---|---|
| 7,774,291 B2* | 8/2010 | Fleming et al. | 706/46 |
| 7,805,455 B2 | 9/2010 | Todhunter | |
| 7,908,438 B2 | 3/2011 | Lemen | |
| 8,341,167 B1* | 12/2012 | Podgorny et al. | 707/758 |
| 2005/0108001 A1 | 5/2005 | Aarskog | |
| 2007/0192085 A1* | 8/2007 | Roulland et al. | 704/9 |
| 2007/0239435 A1* | 10/2007 | Stuhec | 704/9 |
| 2008/0275694 A1* | 11/2008 | Varone | 704/9 |
| 2009/0043797 A1 | 2/2009 | Dorie | |
| 2009/0254510 A1 | 10/2009 | Omoigui | |
| 2010/0048242 A1 | 2/2010 | Rhoads | |
| 2010/0100546 A1 | 4/2010 | Kohler | |
| 2010/0235165 A1* | 9/2010 | Todhunter et al. | 704/9 |
| 2011/0072023 A1* | 3/2011 | Lu | 707/741 |
| 2011/0196859 A1* | 8/2011 | Mei et al. | 707/723 |
| 2011/0295864 A1* | 12/2011 | Betz et al. | 707/754 |

OTHER PUBLICATIONS

German, Tim P. and H. Clark Barrett. "Functional Fixedness in a Technologically Sparse Culture". Psychological Science. vol. 16,—No. 1, Jan. 2005.

P. Rujan, F. Vuillod, B. Gomm, M. Monton, D. Castells-Rufas "AMASS Core: Associative Memory Array for Semantic Search" IP 2007. IP Based Electronic System Conference and Exhibition. Dec. 5-6, 2007. Grenoble, France. see http://www.design-reuse.com/articles/18827/associative-memory-array-semantic-search.html, accessed Mar. 1.

MindForth Free AI Source Code for Robots. Sep. 2008. See http://mind.sourceforge.net/mind4th.html, accessed Mar. 1, 2012.

Hakia, Inc., Hakia Overview,see http://company.hakia.com/new/about.html, accessed Mar. 1, 2012.

Semantic Engines, LLC, The Search Engine that finds sense in a heap of Web pages, see http://www.sensebot.net, accessed Mar. 1, 2012.

Universitaet Innsbruck Institut Fuer Informatik, Essi WSMO Working Group, see http://wsmo.org/index.html, accessed Mar. 1, 2012.

Knowledge Media Institute, The Open University Watson RDF Exploring the Semantic Web, see http://watson.kmi.open.ac.uk/Overview.html, accessed Mar. 1, 2012.

W3C, OWL Web Ontology Language Overview, see http://www.w3.org/TR/owl-features, accessed Mar. 1, 2012.

Princeton University, Office of Communications, Mahlon Lovett, WordNet A Lexical Database for English, see http://www.wordnet.princeton.edu, accessed Mar. 1, 2012.

* cited by examiner

SYSTEM AND METHOD OF SEMANTIC BASED SEARCHING

CROSS-REFERENCE TO RELATED APPLICATIONS

This application claims priority pursuant to 35 U.S.C. 119 (e) to U.S. Provisional Patent Application Ser. No. 61/356,444, filed Jun. 18, 2010, entitled "System and Method of Semantic Based Searching" the entire disclosure of which is incorporated herein by reference.

FIELD

The instant inventive concept relates generally to searching documents containing complex bodies of knowledge, such as patents and research papers. Particularly, the inventive concept relates to methodology and apparatus to interpret the intent of the Searcher (the meaning of the searcher's query) into a MetaLanguage, including but not limited to the use of Fundamental Nature Attributes, Fundamental Action Attributes and Weighting of these attributes as it pertains to the intent of the Searcher. The inventive concept is in the domain of semantic based searches.

The inventive concept uses the same methodology that is used on the searcher's query to mine and store the existing databases of patents and research papers into databases of MetaLanguage for the purpose of producing search results that match the search inquiries.

BACKGROUND

The computer and the access to diverse bodies of information via the Internet have opened a tremendous space of possibilities as a mechanism from which to develop knowledge and innovation.[1] One of the challenges associated with the use of key word searches is to identify meaning: what might be of special interest as it relates to their search. This is more problematic when the searcher has limited understanding or command of other domains in which the key knowledge is required to find association with what they are searching, as it is the case in many cross-disciplinary applications of these domains of knowledge.

[1] Ref: US Patent #20090043797A1, Pub. Feb. 12, 2009

An example of the problem that this creates, for instance, is when a researcher in a cross-disciplinary field searches the US Patent database using key word searches; thousands of records may turn up, many of which are not relevant to the area of interest. While other mechanisms exist to help narrow the search, such as the use of categories this in itself may be quite limiting when exploring innovation. This is because there is a natural tendency for the searchers to remain constrained to what is already intuitively obvious to them. This is a well understood phenomena called Functional Fixedness.[2]

[2] German, Tim P. and H. Clark Barrett. "Functional Fixedness in a Technologically Sparse Culture". Psychological Science. Volume 16, —Number 1.

Another example of the problem that a key-word based search creates, is it constrains the search to exactly what was entered using key words versus an interpretation of what was intended with the search. For instance, the Searcher might be looking for ways to remove oil from clothes in cold water using the key words "remove oil from clothes" but these key words would never reveal the possibility of answers in the realm of biomimicry where for instance, the Antarctic Icefish digests oils in temperatures below −5° C. The key word search is tied to a natural brain operation to work within categories and that is counterproductive to innovation.

But existing semantic based searches don't necessarily resolve these issues either. For instance, a semantic based search engine called Hakia claims to rank relevancy not based on popularity, but based upon "meaning match". But when asking it to find information related to removing oil from clothes, the query is limited in its ability to garner context, and doesn't allow the user to specify to what extent they are expecting answers that might be within a different domain (outside of the context) of the query.

Another semantic query engine called SenseBot is more powerful in its approach by presenting to the user possible different meanings/contexts that enable the user to 'lead' the interpretation. For instance "remove oil from clothes" returns an array of possible other queries by presenting words such as "carpet cleaning clothing grease oil stains washing . . . etc.".

But these search mechanisms do not provide: (a) a natural language input query; (b) a MetaLanguage based on identification of a Fundamental Nature of the Search Query and a Fundamental Nature of the target response; and (c) a semantic-based understanding of Fundamental Actions. The present inventive concept fills the gaps in the shortcomings of the current state-of-the-art in its approach that verbs are predominant in the MetaLanguage approach.

The resolution to this dilemma is first a philosophical one. For instance, what is a 'pen'? The casual approach would be to respond that a pen is a writing instrument. However, in an innovation world, a pen is defined by the intent of the user. When I intend to use it as a writing instrument it may be a pen. When I intend to harm someone with it, it is a weapon. When I use it to keep a door open, it is a door stop.

This philosophical approach is not new. Plato wrote about the concept of language not being an objective reality in and of itself, in his body of work called the Five Dialogues: Euthyphro. In this dialogue between Euthyphro and Socrates we see Euthyphro coming to this conclusion which demonstrates how long this concept has been around for (in terms of language not being an objective reality).

> Socrates: . . . I'm afraid, Euthyphro, that when you were asked what piety is, you did not wish to make its nature clear to me, but you told me an affect or quality of it, that the pious has the quality of being loved by all the gods, but you have not yet told me what the pious is. Now, if you will, do not hide things from me but tell me again from the beginning what piety is, whether loved by the gods or having some other quality—we shall not quarrel about that—but be keen to tell me what the pious and the impious are.
>
> Euthyphro: But Socrates, I have no way of telling you what I have in mind, for whatever proposition we put forward goes around and refuses to stay put where we establish it.[3]

[3] Plato, Five Dialogues: Euthyphro. Translated by G. M. A. Grube.

The philosophical problem is fundamentally one of key word searches being oriented around nouns as fixed objective realities. Similarly, when an invention is developed it is categorized in a domain related to similar nouns with objective realities. This is even more complex, for instance, when searching a given compound where a tremendous domain specific background such as chemistry is required.

Business Application

The implications for the inventive concept from a business standpoint are enormous. For instance, one significant application of the inventive concept is in the domain of sublicensing innovation into non-intuitive domains. An example is the joystick which was used in the domain of computer controls, is now being used for driving a car. Or another example is a gel compound for absorbency in diapers is used as fire retardant to fight fires. These developments appear to be almost 'accidental' rather than an intentional observation of the application of new innovation in one domain into a different domain.

From 1980 to 1999 U.S. patent licensing revenues grew from $3B to $100B, a testimony to the growing importance of the application of intellectual property.[5] The ability to leverage sublicensing of intellectual property particularly in the case of non-intuitive domains is often accidental. Part of the reason for this is that biologically our brains need to categorize. "And yet, imagination stems from the ability to break this categorization, to see things not for what one thinks they are, but for what they might be." (Berns, Gregory. "Iconoclast". Harvard Business Press. P. 37)

[5] Ref: Global Intellectual Property Asset Management Report, July 2005, Volume 7, Number 7. "Intellectual Property Metrics Today: It Can Be Done— part II. By Russell Barron and Linda Hansen (Foley & Lardner), Richard F. Bero (Corporate financial Advisors, LLC), Patrick Thomas (1790 Analytics LLC), Dr. Jan M. K. Jaferian (Lucent Technologies Intellectual property Business), and Michelle Girts (CH2M Hill).

"Perception, however, is constrained by the categories that an individual brings to the table. Although categories may not be absolute, they are learned from past experience, and because of this relationship, experience shapes both perception and imagination. In order to think creatively, and imagine possibilities that only iconoclasts do, one must break out of the cycle of experience-dependent categorization . . . " p. 54 (ibid.)

" . . . the brain operates under the efficiency principle, which means that it will do its job in a way that takes the least amount of energy. It is lazy. The efficiency principle dictates that the brain will take shortcuts based on what it already knows. These shortcuts, although they save energy, lead to perception being shaped by past experience. How you categorize objects determines what you see. And because imagination comes from perception, these same categories hobble imagination and make it difficult to think differently." P. 57 (ibid.)

People with expertise in various specific domains continue to work within those domains to innovate. Furthermore, these people tend to work in silos within their own social networks with little interactions with those outside of them. This makes it challenging to innovate across different domains, to speed the development of associations, and/or recognize the potential for the application of an innovation into a different domain.

The desire to sublicense innovation into non-intuitive domains is also occurring heavily within the domain of life sciences. A common practice known as 'repurposing' drugs has been developed in pharmaceutical industry with the goal to identify secondary or tertiary indicators leading to the application of the drug's ability to help solve a problem in a therapeutic domain that wasn't intended.

Biomimicry is another domain where scientists are looking to nature to solve problems. Per an already mentioned example, looking at the Antarctic icefish and how it digests oils in extreme cold may lead scientists to understanding more powerful mechanisms for cold-water stain-fighting detergents.[6]

[6] Heath, Dan and Chip Heath. "Stop Solving Your Problems". Fast Company, November 2009. P. 82-83.

There is a significant amount of work that exists in the area of semantic searches. It will be appreciated that the below-listed prior-art items, as well as any other prior art patents, articles or other items discussed above, are hereby incorporated herein by reference in their entireties, and that various embodiments of the instant invention may utilize in combination the apparatus and/or methods disclosed in such items in whole or in part.

Prior Art—Ontologies

Onotologies generally are noun-oriented and not verb-oriented in terms of the classifications and properties—which are useful—but not powerful enough for complex searching. Examples of open sourced ontology search systems include:

Web Service Modeling Ontology

Watson Semantic Web Gateway

Ontologies

Resource Description Framework—RDF:

The Resource Description Framework (RDF) is a framework for representing information in the Web.

OWL Web Ontology Language

OWL is intended to be used when the information contained in documents needs to be processed by applications, as opposed to situations where the content only needs to be presented to humans. OWL can be used to explicitly represent the meaning of terms in vocabularies and the relationships between those terms. This representation of terms and their interrelationships is called an ontology.

Wordnet

WordNet® is a large lexical database of English, developed under the direction of George A. Miller. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated with the browser. WordNet is also freely and publicly available for download. WordNet's structure makes it a useful tool for computational linguistics and natural language processing.

Prior Art Semantic Search Patents

U.S. Pat. No. 7,908,438 field of invention is knowledge management systems, and more specifically to associative memory systems, methods and computer program products. Associative memories are widely used in the field of pattern matching and identification, expert systems and artificial intelligence. This particular referenced patent addresses the breakdowns of scaling when dealing with associative memory representation. Associate matrices are capable of counting associations amongst pairs of attributes. This particular patent addresses issues as they related to performance and is may be utilized in combination with features of one or more embodiments of the instant invention as is discussed below in more detail.

The application of associative memories to search engines is not new. Some publications such as "AMASS Core: Associative Memory Array for Semantic Search" by P. Rujan, F. Vuillod, J. Schwenninger, A. Mages, Learning Computers Int. GmbH, C. Layer, H-J. Pfleiderer, University of Ulm. This paper in particular speaks about the use of associative memories to implement a general purpose associative dynamic memory towards improving the tremendous costs of indexing. The authors of the above paper propose doing so by first constructing from the text statistically significant features. Once appropriately identified, semantic similarity is identified by 'forcing synonyms' into the proposed form. Notwithstanding the techniques described within that document, there continues to be an issue with the selection of what is considered as a 'statistically significant feature' and of effectively mining and query the data that is stored in an associative memory in order to conduct searches. While U.S. Pat. No. 7,774,291 and U.S. Pat. No. 7,478,090 provide solutions to this problem, they still suffer from high costs of the search and have an inferior ability to identify similarities and/or analogies compared to that of the instant invention.

Of particular importance, however, in U.S. Pat. No. 7,774,291 is the use of a relevance score provided by querying the feedback memory to compute the strength of association between a given entity and a task, using personal feedback knowledge to capture positive (relevant) and negative (irrelevant) feedback for an entity, document or association for a current task as seen by the user. What has not been provided in this, however, is the importance of understanding various categories of users and/or their "profiles" to help improve the relevance of searches of other users with similar "profiles". The profiles of user of the instant invention, as is discussed below in more detail, are based predominantly on work-related behavioral traits as provided by psychological behavioral profiles, and educational and/or experiential backgrounds (e.g. mechanical engineering, electrical, chemical, etc.) as provided or indicated by users based on the domain in which they are operating as compared with the domain in which they are investigating (which can be very different). This capability of the instant invention extends beyond what this patent discusses in terms of facilitating workflow by enabling an interactive knowledge repository. This capability of the instant invention includes using associative memories to capture the relationship of profiles to relevance scores.

U.S. Pat. No. 7,805,455 and U.S. Pat. No. 7,251,781 speak to the situation in which a user does not have adequate domain knowledge requiring the user to conduct independent research using whatever means are available to find useful information—including using books, public internet search engines, private data subscription services, internal enterprise portals, or other sources of relevant technical information. The proposed solution fails to address what will eventually become an unscalable solution with the use of common database practices to identify cause-effect relationships and the queries required to identify those.

When dealing with knowledge representation particularly in situations of queries where one is formulating a query or problem statement and looking for a solution, again the issues related to abstraction and knowledge representation particularly in very complex domains can severely limit the practical use of any such invention. U.S. Pat. No. 7,536,368 puts forward an invention of a problem analysis tool that automatically reformulates a problem statement into a natural language or Boolean query that is automatically submitted via a knowledge search tool to a database, and responses to this query from the database are automatically provided. Extracting what might be deemed as 'key elements' of the problem is not trivial. There exists the natural limitation of the user's knowledge, the limited representation within the knowledge database and therefore the limited extraction of meaning from it, and the difference that context can make both for the person conducting the query as well as the original context of the solution. The instant invention, as discussed below in more detail, addresses all of the aforementioned challenges: the development of 'wikis' for the database which enables people to ask questions and receive answers from the original 'owner' of the document/book etc. and/or the comments from other users enable an enriched context from which to query. Furthermore, the use of associative memories facilitates the speed of query results, improves scalability of the overall solution and leverages human intelligence as part of the solution. The use of MetaLanguage—an abstraction layer—combined with associative memories improves the overall solution yet again.

U.S. Pat. No. 7,120,574 describes a computer search that expands a user query with two synonym dictionaries—actions and object—and then validates the expanded queries with entries in a Subject-Action-Object Knowledge Database (SAO KB). This latter database is prepared from natural language texts and contains fields with subjects, actions, objects and 'main parts of objects' extracted from the object. The patent specifically lists verb-noun expressions that are synonymous with other verbs and relates to computer based search systems and in particular narrowing searches for the user's convenience. The instant invention uses a set of thesaurus' that are specific to a given domain of discipline and prepares a relationship of verbs to "Fundamental Actions"—that is a set of verbs that are abstracted and form a MetaLanguage across all disciplines. The philosophy is also very different for the instant invention: while verb-object relationships exist the philosophical approach of the instant invention is to emphasize the verb through the use of matching "Fundamental Actions" and de-emphasize the noun by categorizing the nouns in domains of "Fundamental Natures" in order to facilitate cross-industry applications. This has the additional benefit, especially in combination with associate memories, of speeding up the query. The instant invention also ties the use of Attributes to Fundamental Natures as opposed to the use of attributes of objects. This generalization or abstraction of attributes of Fundamental Natures (a category of the objects) is fundamental instead of specific and as such a significant departure from what was put forward in U.S. Pat. No. 7,120,574.

U.S. Pat. No. 6,167,370 field is an invention for document semantic analysis/selection with knowledge creativity capability utilizing subject-action-object (SAO) structures. The system performs substantially the same semantic analysis on each candidate document as performed on the user input search request. That is, the system generates an SAO structure(s) for each sentence of each candidate document and forwards them to the comparative Unit where the request SAO structures are compared to the candidate document SAO structures. Those few candidate documents having SAO structures that substantially match the request SAO structure profile are placed into a retrieved document Unit where they are ranked in order of relevance. The system then summarizes the essence of each retrieved document by synthesizing those SAO structures of the document that match the request SAO structures and stores this summary for user display or printout. Users can later read the summary and decide to display or print out or delete the entire retrieved document and its SAO's. The instant invention is a significant departure from the aforementioned approach. For one, the pattern recognition capabilities provided for in associative memories provide a rich context for addressing issues of relevance. Context dependency is critical for eliminating irrelevant queries. Furthermore, the instant invention puts forward a MetaLanguage that compares and contrasts Fundamental Natures, attributes and Fundamental Actions, in some embodiments, in the context of associative memories providing for improved performance and relevance.

Other patents of general relevance in semantic searches include:

U.S. Pat. No. 6,453,315—Meaning-based information organization and retrieval. Abstract: The present invention relies on the idea of a meaning-based search, allowing users to locate information that is close in meaning to the concepts they are searching. A semantic space is created by a lexicon of concepts and relations between concepts. A query is mapped to a first meaning differentiator, representing the location of the query in the semantic space. Similarly, each data element in the target data set being searched is mapped to a second meaning differentiator, representing the location of the data element in the semantic space. Searching is accomplished by determining a semantic distance between the first and second meaning differentiator, wherein this distance represents their closeness in meaning Search results on the input query are presented where the target data elements that are closest in meaning, based on their determined semantic distance, are ranked higher.

U.S. Pat. No. 7,689,410—Lexical semantic structure. Abstract: A lexical semantic structure for modeling semantics of a natural language input on a computer is described. A set of lexical semantic categories is selected to model content of the natural language input. A methodology associates content of the natural language input to one or more categories of the set of lexical semantic categories.

U.S. Pat. No. 7,558,778—Semantic exploration and discovery. Abstract: A semantic discovery and exploration system is disclosed where an environment enabling a developer or user to uncover, navigate, and organize semantic patterns and structures in a document collection with or without the aid of structured knowledge. The semantic discovery and exploration system provides techniques for searching document collections, categorizing documents, inducing lists of related concepts, and identifying clusters of related terms and documents. This system operates both without and with infusions of structured knowledge such as gazetteers, thesauruses, taxonomies and ontologies. System performance improves when structured knowledge is incorporated. The semantic discovery and exploration system may be used as a first step in developing an information extraction system such as to categorize or cluster documents in a particular domain or to develop gazetteers and as a part of a deployed run-time information extraction system. It may also be used as standalone utility for searching, navigating, and organizing document collections and structured knowledge bases such as dictionaries or domain-specific reference works.

U.S. Pat. No. 7,120,574—Synonym extension of search queries with validation. Abstract: A computer search involves expanding a user query with two synonym dictionaries—actions and object—and then validating the expanded queries by comparison with entries in a Subject-Action-Object Knowledge Database (SAO KB) in a discipline corresponding to the query. The latter is prepared from natural language texts and contains fields with subjects, actions, objects, and "main parts of objects" extracted from the object.

U.S. Pat. No. 6,246,977—Information retrieval utilizing semantic representation of text and based on constrained expansion of query words. Abstract: The present invention is directed to performing information retrieval utilizing semantic representation of text. In a preferred embodiment, a tokenizer generates from an input string information retrieval tokens that characterize the semantic relationship expressed in the input string. The tokenizer first creates from the input string a primary logical form characterizing a semantic relationship between selected words in the input string. The tokenizer then identifies hypernyms that each have an "is a" relationship with one of the selected words in the input string. The tokenizer then constructs from the primary logical form one or more alternative logical forms. The tokenizer constructs each alternative logical form by, for each of one or more of the selected words in the input string, replacing the selected word in the primary logical form with an identified hypernym of the selected word. Finally, the tokenizer generates tokens representing both the primary logical form and the alternative logical forms. The tokenizer is preferably used to generate tokens for both constructing an index representing target documents and processing a query against that index.

U.S. Pat. No. 6,161,084—Information retrieval utilizing semantic representation of text by identifying hypernyms and indexing multiple tokenized semantic structures to a same passage of text. Abstract: The present invention is directed to performing information retrieval utilizing semantic representation of text. In a preferred embodiment, a tokenizer generates from an input string information retrieval tokens that characterize the semantic relationship expressed in the input string. The tokenizer first creates from the input string a primary logical form characterizing a semantic relationship between selected words in the input string. The tokenizer then identifies hypernyms that each have an "is a" relationship with one of the selected words in the input string. The tokenizer then constructs from the primary logical form one or more alternative logical forms. The tokenizer constructs each alternative logical form by, for each of one or more of the selected words in the input string, replacing the selected word in the primary logical form with an identified hypernym of the selected word. Finally, the tokenizer generates tokens representing both the primary logical form and the alternative logical forms. The tokenizer is preferably used to generate tokens for both constructing an index representing target documents and processing a query against that index.

U.S. Pat. No. 6,101,492—Methods and apparatus for information indexing and retrieval as well as query expansion using morpho-syntactic analysis. Abstract: An index generator and query expander for use in information retrieval in a corpus. A corpus is provided as an input to an inflectional analyzer, which produces a lemmatized corpus having base forms and associated inflections for each word in the original corpus. The lemmatized corpus is provided as an input to a disambiguator, which performs part of speech tagging and morpho-syntactic disambiguation to produce a disambiguated corpus. The disambiguated corpus is provided as an input to a derivational generator, which produces an expanded corpus having all possible valid derivatives of each word of the disambiguated corpus. The disambiguated corpus is provided as an input to a transformational analyzer, using a grammar and a metagrammar for analyzing syntactic and morphosyntactic variations to conflate and generate variants, producing an index to the corpus having a minimum of variants. Alternatively, a query expander is provided utilizing similar techniques.

Therefore, an unaddressed need exists to accelerate the association between distinct bodies of research, patents, and documents—in a way that breaks through categorization and involves the original researchers to provide clarification, understanding, and simplification of the underlying mechanics, principles and/or laws discussed within the documentation.

SUMMARY

The present inventive concept, also known as "Cross Innovation[SM] (CI) Search Engine (SE)" or CI Finder[SM], creates a 'MetaLanguage' that is universal across different bodies of knowledge. This MetaLanguage is an abstraction in language of the object, situation and/or act regardless of domain, so that different knowledge domains with specific vocabularies can share a common language.

Through the new associative capability of the instant invention, the CI Finder[SM] offers pathways that stimulate the user both in creativity and cross innovation. The CI Finder[SM] provides the user with access to just-in-time (JIT) knowledge from the universe of knowledge currently available that no single human being can cover. In addition the CI Finder[SM] increases the effectiveness of searches even for a very knowledgeable searcher within the same domain due to the very nature of its methodology being agnostic to specific key word or categorization.

Therefore, the instant invention in one embodiment relates to a method of creating a MetaLanguage for the purposes of abstracting descriptions such that commonality is more readily assessed—particularly as it pertains to conducting searches against a database of documents (i.e. research journals, intellectual property, writing, etc.)—so that new associations are more rapidly created.

What is meant by a 'MetaLanguage' is an abstraction of key attributes which itself is in language.

The instant invention in another embodiment relates to a method of mining the documents for a MetaLanguage, certain fundamental attributes, for later access and retrieval within a computerized system.

In another embodiment the instant invention relates to a method of providing guidance to a searcher to explain the searcher's intent, and a computer program of the instant invention transforms the searcher's provided intent into a MetaLanguage from which certain fundamental attributes can be matched with those attributes (MetaLanguage) of a targeted set of documents.

In another embodiment, the instant invention relates to methodology of matching and providing relevancy between a search query and targeted documents, depending on whether the purpose of the search is discoverability within the common domain of knowledge or outside of the immediate domain of knowledge.

And in another embodiment, the instant invention relates to the ability to "crowd-source", i.e. to solicit the participation of many people to agree on the characterization of the document, by agreeing to the words used and the weighting of those words as it pertains to the original document. In still another embodiment crowd-sourcing is utilized for the development of specific areas of 'Fundamental Natures' (defined later in this document) and their associated dictionaries.

While this invention is referred to in the context of patents and journals it will be appreciated that the invention may be utilized in connection with any set of documents, information or other searchable data.

Commonly used search mechanisms of the prior art require the user to input criteria for their search according to key words or phrases. This requires the user to have built-in to their understanding, a thesaurus from which to draw phrases that might appear within the body of the document or set of documents being searched.

When the user of a prior art search mechanism is inexperienced in a given domain, for instance, a mechanical engineer who may be searching for something in a related domain of chemistry, the user's prior understanding of words or phrases can be extremely problematic. The meaning of the word can change depending on the domain or context. Fundamentally, this relies on the subjective categorization of understanding within the person, which may result in much more information and results than is necessary. The opposite is also true. When a person is an expert in the domain, the categorization within their head may result in a much narrower field of search than is necessary or wanted.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION OF A PREFERRED EMBODIMENT

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The MetaLanguage Philosophical Basis of the Instant Invention

In general, a MetaLanguage is defined as " . . . a language used to make statements about statements in another language which is called the object language."

The MetaLanguage of the instant invention is an interpretation produced from the natural language of the Searcher, tags produced related to context, Document(s) or set thereof.

The MetaLanguage itself abstracts a set of "Fundamental Attributes" from the Searcher or Document (or set thereof) defined by (a) Fundamental Actions; (b) Fundamental Natures; and (c) Fundamental Qualifiers.

The Attribute Process (i.e. the process of determining or assigning "Fundamental Attributes" to a document or other piece of information) is based on the work by Plato on 'Fundamental Forms' in "Sophist" where he talks about the world of " . . . Forms, where the true objects of knowledge are to be found".[8] The instant invention expands upon this work and applies it to search engines and the acceleration of associations.

[8] Plato. F. M. Cornford (Translated with Commentary). Plato's Theory of Knowledge: The Theatetus and The Sophist (Philosophical Classics). Dover Publications, Inc. Mineola, N.Y. © 2003.

In his work Plato identifies five (5) Fundamental Forms (or Fundamental Attributes): (1) Existence; (2) Motion; (3) Rest; (4) Sameness; and (5) Difference.

Figure 1:
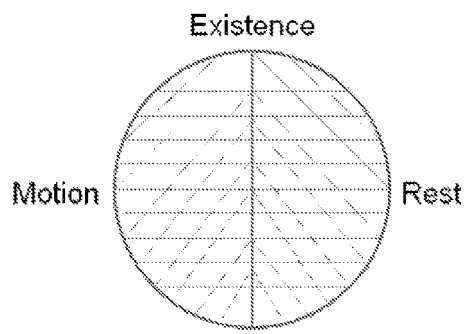
FIG. 1 shows the relationship between three of the five Fundamental Forms (or Fundamental Attributes) identified by Plato: Existence, Motion, and Rest. In his work Plato identifies five (5) Fundamental Forms (or Fundamental Attributes): (1) Existence; (2) Motion; (3) Rest; (4) Sameness; and (5) Difference.

The relationship or association between the first three forms is represented in FIG. 1. The line in the middle represents the incompatibility between Motion and Rest, and horizontal lines represent the pervasiveness of 'Existence' as a Fundamental Form in both Motion and Rest, i.e., Existence is either in Motion or at Rest but cannot in both.

Figure 2:
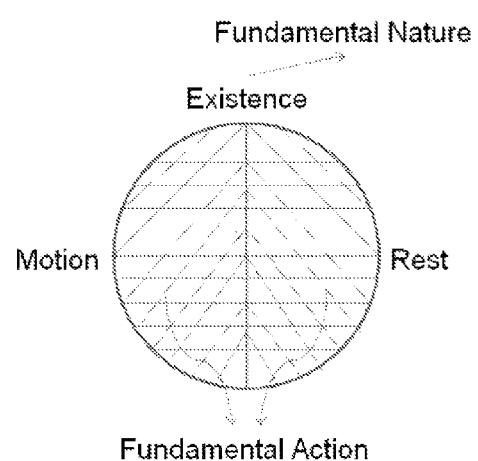
FIG. 2 shows Plato's Existence, Motion, and Rest in relation to the concepts of Fundamental Nature and Fundamental Action.

The meaning of the first three fundamental forms is extended by the instant invention in the manner set forth in FIG. 2. FIG. 2 shows that Motion and Rest are interpreted through the instant invention by transitive verbs (and sometimes by algorithms operating on prepositional phrases) and their noun relationships, and the MetaLanguage of Fundamental Action. FIG. 2 also shows Existence being interpreted in connection with the instant invention by intransitive verbs and associated nouns, Fundamental Nature, and Fundamental Qualifiers which characterize the subject in a phrase with intransitive verbs—within Fundamental Nature.

Figure 3:
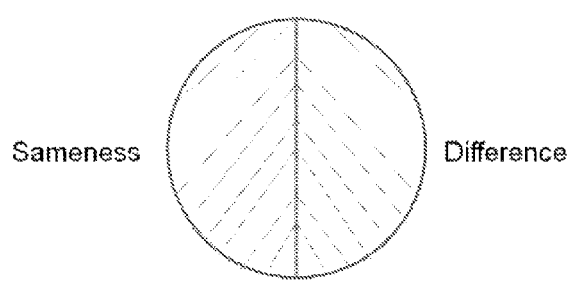
FIG. 3 shows the relationship of Plato's Sameness and Difference.

As shown in FIG. 3, Sameness and Difference represent Fundamental Forms (Attributes) which can be applied to any associative process.

The Nature of Fundamental Nature

Fundamental Nature is arrived at linguistically by identifying the use of intransitive verbs. These intransitive verbs are clues as to either the physical properties of the 'Existence', or the functions of the 'Existence'.

For instance, in U.S. Pat. No. 3,933,895, section of the "Background of The Invention" states:

"The prostaglandin formulas mentioned above each have several centers of asymmetry."

| Fundamental Qualifier of subject | Subject(s) | Verb | Physical Property |
|---|---|---|---|
| Prostaglandin | Formulas | Have | Several centers of asymmetry |

In this example the verb "have" is intransitive, and therefore "several centers of asymmetry" is a property of the prostaglandin formulas. Furthermore, we recognize it as a property because the phrase contains no nouns acting as verbs, which might lead us to interpret this as a 'function' of the Existence vs. a physical property of the Existence.

We further classify Existence (Fundamental Nature), as a Form, as having several Sub-Forms:

A. Fact: This is a sub-form that if measured by independent observers, would be consistent as reported by all observers. For instance, "the water was 100 degrees Celsius".

B. Opinion. This is a sub-form that cannot be measured, but can be shared amongst a group of observers. For instance, "the dress is ugly". Categories of opinion are related to history, culture and sociology, and include: Behavior (appropriate, rude), Beauty (ugly, beautiful), and Sociability (outgoing, recluse).

C. Fuzzy Fact: This is a sub-form which if it were measured could be validated, but there is an element of fuzziness in the sense of fuzzy logic. So for instance, "the color of the water is red". There is no doubt that light can be measured. That the object appears red might be true, and for some it might look pink, and others it might be purple—and to any normal seeing persons, they would not call it baby blue. But—given light is a spectrum, at what point does one no longer call it red? Categories of Fuzzy Facts include:

a. As related to our eyes: color, texture (rough, smooth), luminosity (light, dark).

b. As related to kinesthetic sense: temperature (hot, cold), size (big, small), force (strong, weak), weight (light, heavy).

c. As related to hearing: Audibility (loud, soft).

d. As related to smell: Sense (foul, sweet)

e. As related to taste: Sense (sweet, sour, salty, bitter, umami)

Functions (or Fundamental Actions) of 'Existence' however, we identify not with just intransitive verbs, but the prepositional phrases which follow have nouns acting as verbs, and the resulting analysis results in a Fundamental Actions being classified.

For instance:

"For that reason, PGA compounds are useful in managing cases of renal dysfunction, especially those involving blockage of the renal vascular bed."

| Fundamental Qualifier of subject | Subject(s) | Verb | Function |
|---|---|---|---|
| PGA | Compounds | are | in managing cases of renal dysfunction, especially those involving blockage of the renal vascular bed |

In this example the verb "are" is intransitive, but in the prepositional phrases that follow we find several nouns acting as verbs:

A. " . . . in managing cases of renal dysfunction . . . " contains the noun 'managing' which is acting as the verb "to manage" which is defined as " . . . to handle or direct with a degree of skill" or " . . . to make and keep compliant"[9] (assigned through the MetaLanguage of the instant invention the Fundamental Action being classified as "Manipulate"); and

[9] Langenscheidt's New College Merriam-Webster English Dictionary. (c) 1996 Merriam-Webster, Inc. Springfield, Mass., U.S.A. and © 1998 Langenscheidt K G, Berlin and Munich. Printed in Germany. P. 706

B. The prepositional phrase " . . . especially those involving blockage of the renal vascular bed" qualifies or modifies the noun renal dysfunction (assigned through the MetaLanguage of the instant invention the Fundamental Action being classified as "Combine").

Tabular, we might represent it as follows:

| Fundamental Qualifier of subject | Subject(s) | Function | Object |
|---|---|---|---|
| PGA | Compounds | Manage (Fundamental Action = MANIPULATE) | Cases of renal dysfunction |
| Blockage (Fundamental Action = STOP[10]) of Renal vascular bed | Renal dysfunction | Involving (Fundamental Action = COMBINE) | |

[10] The term "stop" is assigned to "blockage" through the MetaLanguage of the instant invention Fundamental nature is found in many levels of complexity. For instance, if started with the "Atom" as an object of interest with a specific nature, we would find that the atom is made up of another set of objects with their own Fundamental Natures, Subatomic particles called the proton, neutron and electron.

From a layer of aggregation of atoms or elements, we would find a classification called "compounds" which are chemical in nature, behaving consistently within a set of rules defined by chemistry and we might further branch into synthetic, organic, inorganic or bio-organic compounds.

In a further layer of aggregation of compounds, particularly inorganic, we would find ourselves in the classification of materials, such as metal, polymeric, or ceramic. Composites could then be at the top of this hierarchy comprised of different materials.

We would then find that Fundamental Actions of a phrase may occur in many (one or more) different Fundamental Natures. This is shown in FIGS. 4 and 5.

Figure 4:
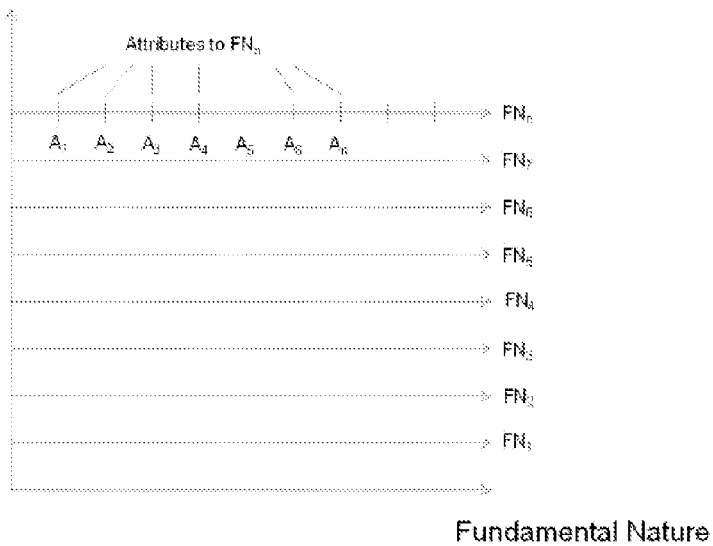
FIG. 4 shows that Fundamental Actions of a phrase may occur in many (one or more) different Fundamental Natures.
Figure 5:
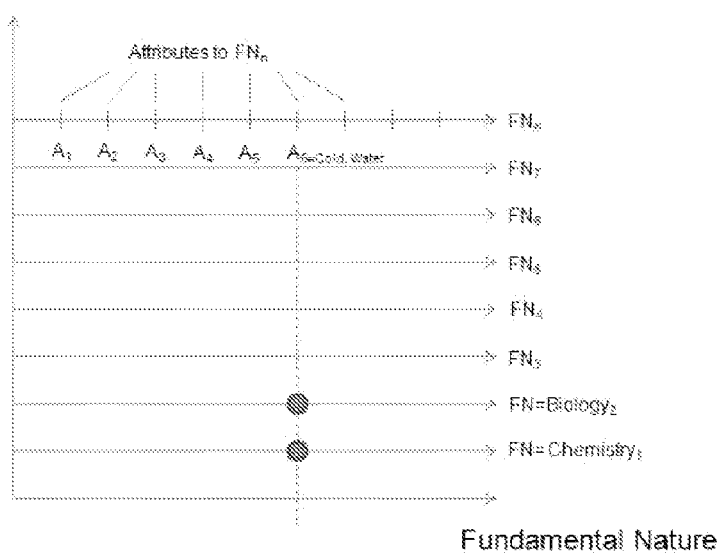
FIG. 5 demonstrates an example of how Fundamental Actions of a phrase may occur in many (one or more) different Fundamental Natures.

FIG. 4 illustrates how the same Fundamental Actions ($FA_X$) can occur in many different or possibly all Fundamental Natures ($FN_{1-N}$), and how attributes ($A_{1-N}$) to the specific Fundamental Nature (FN) may or may not be in common with other Fundamental Natures.

This understanding is used to drive search results and to order search results in terms of relevancy.

For instance, if a searcher were to make an inquiry where the intent was to remove oil stains from clothes in cold water, we can see how the set of possibilities of the Fundamental verb-object relationship (to remove-oil stains or Fundamental Action=SEPARATE, verb noun relationship is remove-stains and Oil is a particular attribute in a Fundamental Qualifier that is of the class of Fundamental Natures Chemical and Liquid—being Oil) in a given attribute context (in cold water) could be extended into other domains such as the Antarctic Icefish which operates (to digest-oils or Fundamental Action=SEPARATE) in a similar context (in cold water).

In this example the Fundamental Action occurs in two different Fundamental Natures, namely chemical and biological. FIG. 5 illustrates this example.

The MetaLanguage Overview
Fundamental Action

We define Fundamental Action as follows:

Fundamental Action is a MetaLanguage used to define the dominant actions of the document or text in question. These are derived from transitive verbs as well as applicable prepositional phrases of intransitive verbs where there are nouns acting as verbs (i.e. words ending in 'tion' such as elevation (the act to elevate), 'sion' such as fusion (the act to fuse), 'ing' such as breathing (the act to breath), 'age' such as blockage (the act of obstructing) etc.).

TABLE 1

Exemplary Fundamental Action Table

| FA (Fundamental Action) | Type of Action (i.e. Motion or Rest) | Opposite FA |
|---|---|---|
| TRANSFORM | Motion | |
| MANIPULATE | Motion | |
| STOP | Rest | START |
| START | Motion | STOP |
| MOVE | Motion | STOP/STAY |
| STAY | Rest | MOVE |
| COMBINE | Motion | SEPARATE |
| SEPARATE | Motion | COMBINE |
| IDENTIFY | Rest | |
| MEASURE | Rest | |

It will be appreciated that the Exemplary embodiment of the Fundamental Action Table described herein may be modified by adding or deleting Fundamental Action items without departing from the spirit and scope of the instant invention. It will further be appreciated that alternative forms of the Fundamental Action Table may be utilized without departing from the spirit and scope of the instant invention.

Verbs are mapped to Fundamental Actions via a Custom Thesaurus of the instant invention which considers the context of the document and/or the declared Fundamental Nature of the search.

Fundamental Nature

Fundamental Nature is a MetaLanguage used to define the predominant physical characteristics of the document or text in question. The set of characteristics are defined in an Exemplary embodiment, for the purposes of investigating solution sets to scientific inquiries, as follows:

TABLE 2

Preliminary Fundamental Nature Table (un-aggregated)

| |
|---|
| ELECTRONIC |
| BIOLOGICAL |
| MECHANICAL |
| ELECTRICAL |
| STRUCTURAL |
| FLUID |
| THERMODYNAMIC |
| CHEMICAL |
| OPTICAL |
| NUCLEAR |
| INFORMATIONAL |

It will be appreciated that the Exemplary embodiment of the Fundamental Nature Table described herein may be modified by adding or deleting Fundamental Nature items without departing from the spirit and scope of the instant invention. It will further be appreciated that alternative forms of the Fundamental Nature Table may be utilized without departing from the spirit and scope of the instant invention.

In the exemplary embodiment, there are several types of Thesauruses used: There could be multiple custom Thesauruses for each Fundamental Nature, and there will be one Fundamental Action Thesaurus for each Fundamental Nature. In some embodiments, thesauruses are stored in multiple relational database tables. In other embodiments, Thesauruses are stores as part of an associative memory array. In some such embodiments, the associative memory array further includes similarity and/or pattern matching data (such as are described in more detail in any of U.S. Pat. Nos. 7,908, 438, 7,774,291, 7,565,491, 7,478,192, and 7,478,090, the disclosures of which are incorporated herein by reference in their entireties). The Thesaurus in these contexts associates a word to a Fundamental Nature, and a verb to a Fundamental Action.

TABLE 3

Exemplary Fundamental Nature Thesaurus

| Fundamental Nature assigned through the custom thesaurus of the instant invention | FN Thesaurus (word from a phrase being evaluated by the system of the instant invention) |
|---|---|
| ELECTRONIC | Semiconductor |
|  | Transistor |
| BIOLOGICAL | Organic |
|  | Living |

Example

Using computational linguistics, subject-verb-object relations are identified (i.e. necessarily transitive verbs in this case) with the verb being translated into a Fundamental Action MetaLanguage via a specialized (custom) thesaurus predicated on the context of the Fundamental Nature.

For instance, U.S. Pat. No. 3,933,895 (the entire disclosure of which is incorporated herein by reference) is an invention of a group of oxyphenylene compounds and processes for making them. Its Fundamental Nature is "Chemical" and secondary Fundamental Nature is "Biochemical". In the '895 patent, the inventor states:

" . . . these compounds control spasm and facilitate breathing in conditions such as bronchial asthma, bronchitis, bronchiectasis, pneumonia and emphysema."

| Fundamental Qualifier of subject | Subject(s) | Verb | Object(s) |
|---|---|---|---|
| PGE, PGF.sub . . . alpha., PGF.sub . . . beta., and PGA | Compounds | control | Spasms |
| PGE, PGF.sub . . . alpha., PGF.sub . . . beta., and PGA | Compounds | facilitate | breathing |

For this reason, using a Custom Thesaurus, we create the following MetaLanguage relationships:

| Fundamental Qualifier of subject | Subject(s) | Verb | FA | Object(s) | FN |
|---|---|---|---|---|---|
| PGE, PGF.sub . . . alpha., PGF.sub . . . beta., and PGA | Compounds | control | Manipulate | Spasms | Biological |
| PGE, PGF.sub . . . alpha., PGF.sub . . . beta., and PGA | Compounds | facilitate | Move | breathing | Biological |

Architecture Overview

In preferred embodiments of the instant invention, the CI Network Search Engine (CI Finder$^{SM}$) is operated as a stand-alone/private network model; in alternative embodiment, the CI Finder$^{SM}$ is operated in a Software-As-A-Service (SAAS) configuration. Regardless, the basic elements are the same:
  A. Presentation Layer (GUI): This layer is comprised essentially of a computer monitor, computing processing within a web server or a desktop acting to render information to the end-user, and algorithms to undertake this activity (designated throughout this document as '100' level notations);
  B. Application Layer: This layer is comprised essentially of computing processing and software algorithms used to perform complex analytics such as (but not limited to) language processing, interpretation, ranking of search results (designated throughout this document as '200' level notations);
  C. Database/Memory Layer: This layer is comprised of computing processing, software algorithms and database or other memory (i.e. associative memory array) storage (referenced throughout this document as '300' level notations).

Figure 6:
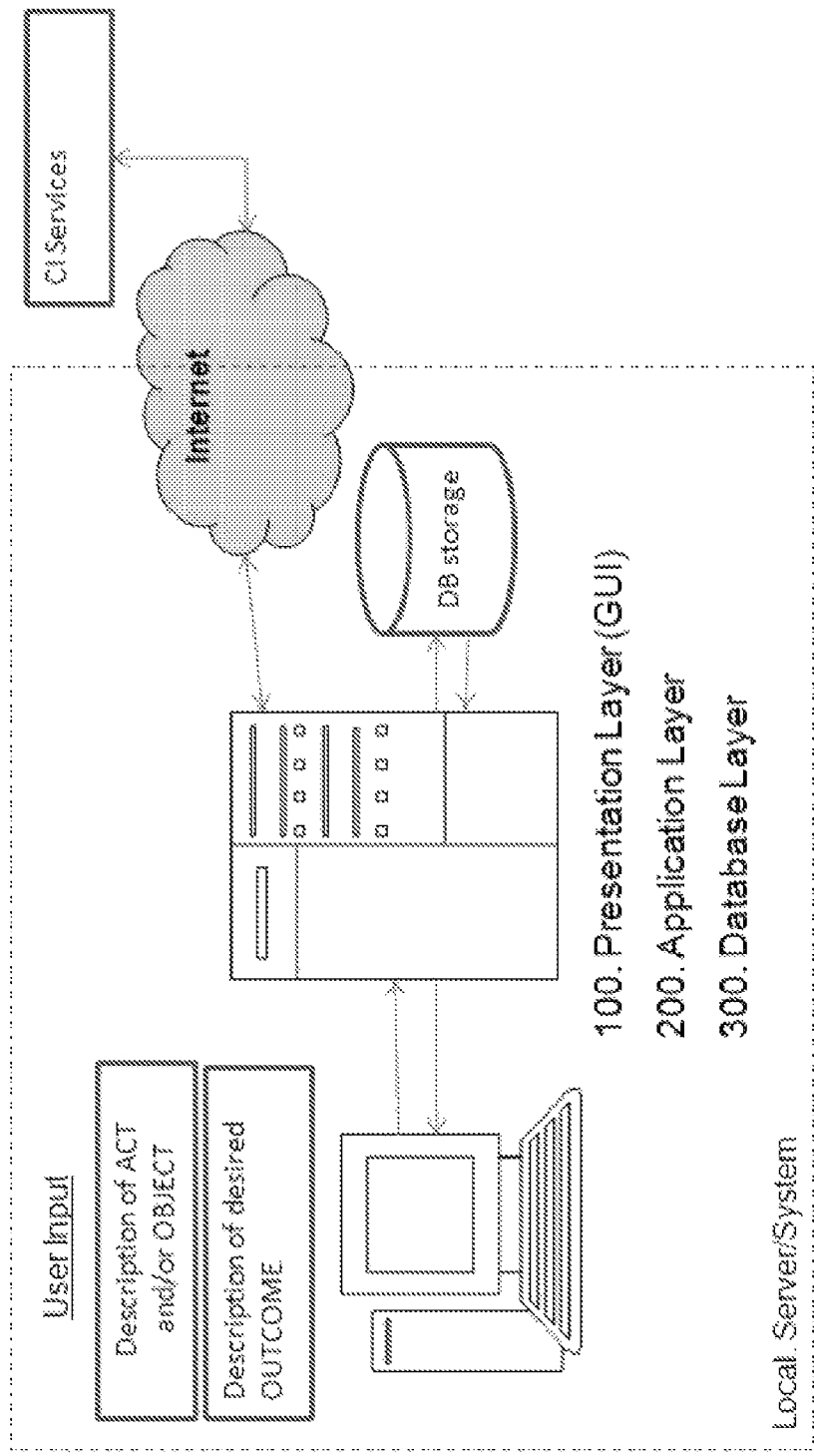
FIG. 6 shows an exemplary embodiment of a stand-alone/private network architecture of the instant invention.
Figure 7:
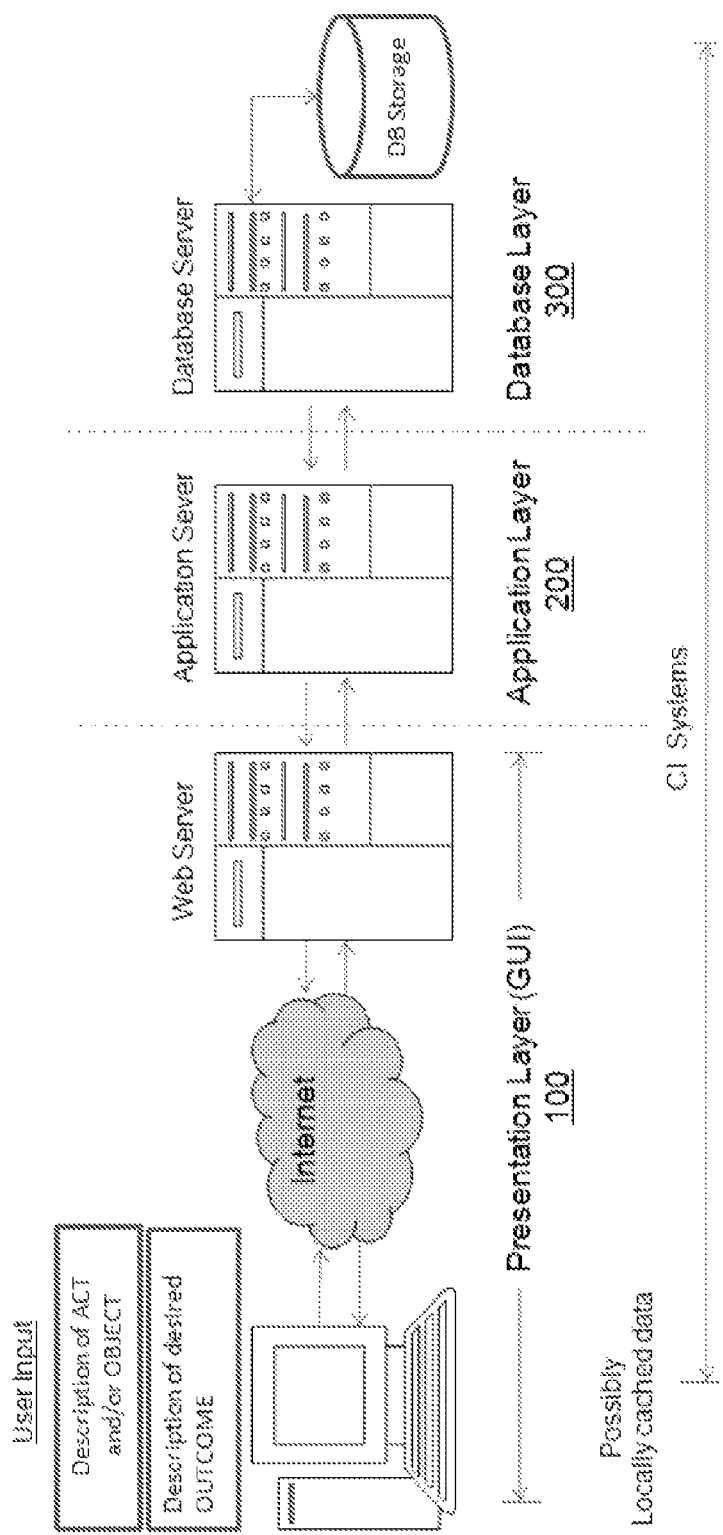
FIG. 7 shows an exemplary embodiment of a SAAS configuration architecture of the instant invention.
Figure 8:
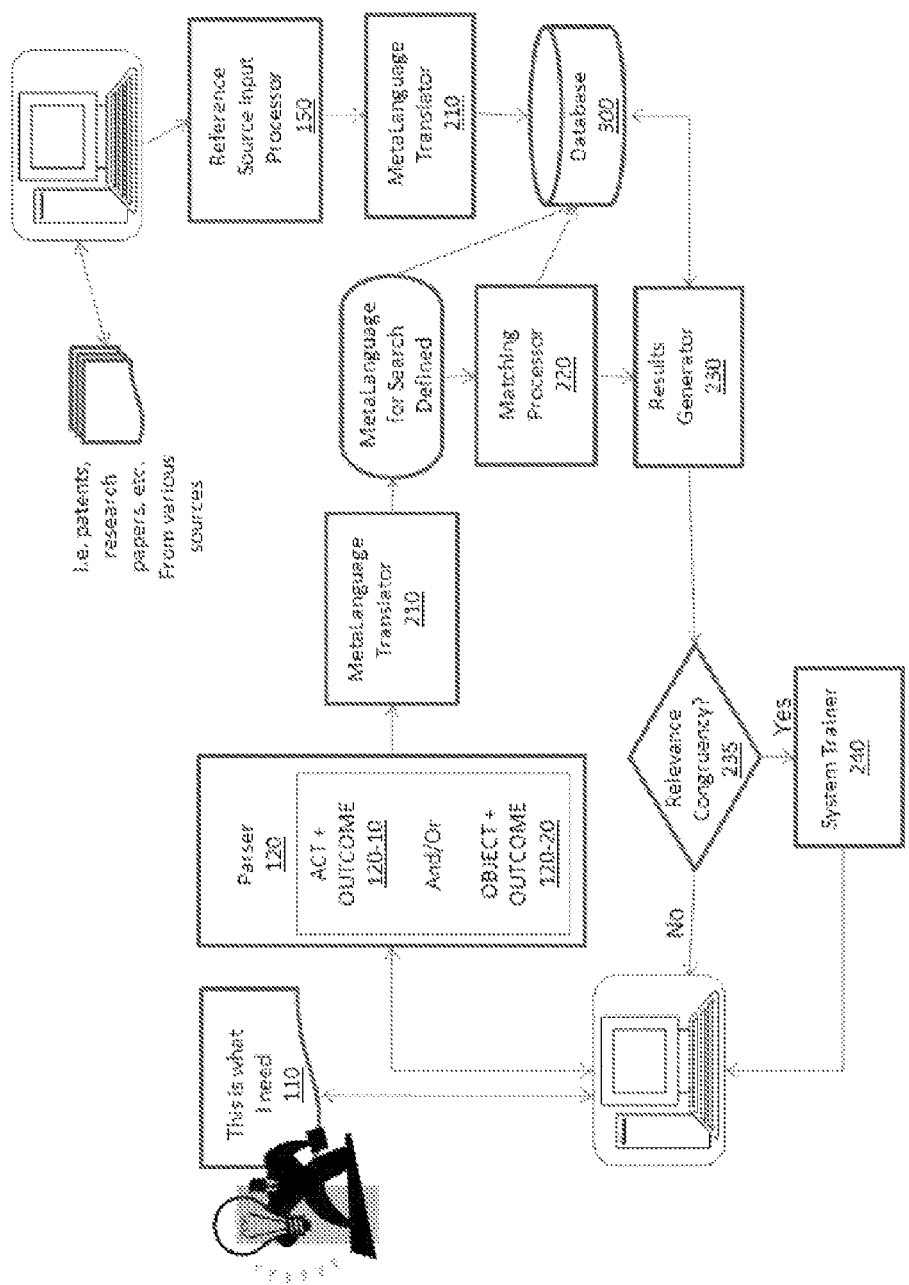
FIG. 8 shows a functional architecture of an example of the instant invention.

Both stand-alone/private network architectures and SAAS configuration architecture are shown in FIGS. 6 and 7. The invention functional architecture is represented in FIG. 8.
Reference Source Input Processor 150

Figure 9:
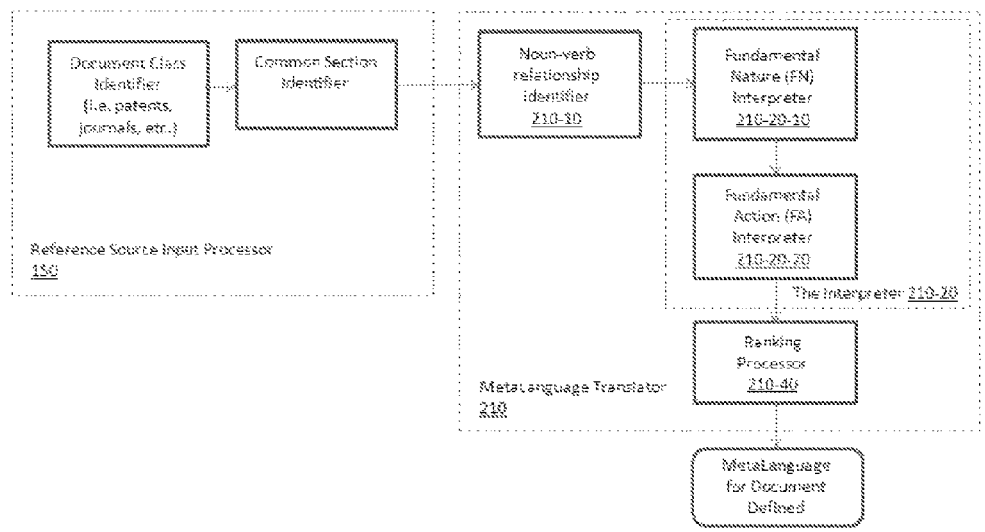
FIG. 9 shows a portion of the system of an exemplary embodiment of the instant invention including the Reference Source Input Processor and the MetaLanguage Translator.

In embodiments of the invention shown in FIGS. 8 and 9, a Reference Source Input Processor 150 is shown. A set of documents is provided to the system in various forms such as hard copies, CDs, DVDs or electronic files. During the input process these documents are digitized and stored by certain attributes in common (i.e. body of research documents, journals, patents).

The Reference Source Input Processer 150 is functionally comprised of two subroutines: Document Class Identifier and Common Section Identifier. Both of these routines operate to solicit input from Cross Innovation.NET, LLC (CI) programmers to load via the Graphical User Interface (GUI) the information to identify the given body of documents which is then passed to the Database Server (or associative memory array) and into appropriate tables/matrices.
Identification Document Class and Sections In the disclosed embodiment, we define a Document Class as a logical grouping of a set of documents that may have: (a) a common purpose (i.e. patents—to protect intellectual property); or (b) common owner/publisher (i.e. journal—which contains similar formats and knowledge domain).

Each document class may have similar sections. If that is the case, we intentionally create a table that contains the document class and a list of those sections, and any possible weighting associated with these classes as it pertains to the MetaLanguage.

TABLE 4

Document Class = Patent and associated Sections and Weighting

| Section | Weighting |
|---|---|
| CLASSIFICATION | 1.0 |
| TITLE | 10.0 |
| ABSTRACT | 5.0 |
| CLAIMS | 0.5 |
| DESCRIPTION | 1.0 |

MetaLanguage Translator 210

Figure 10:
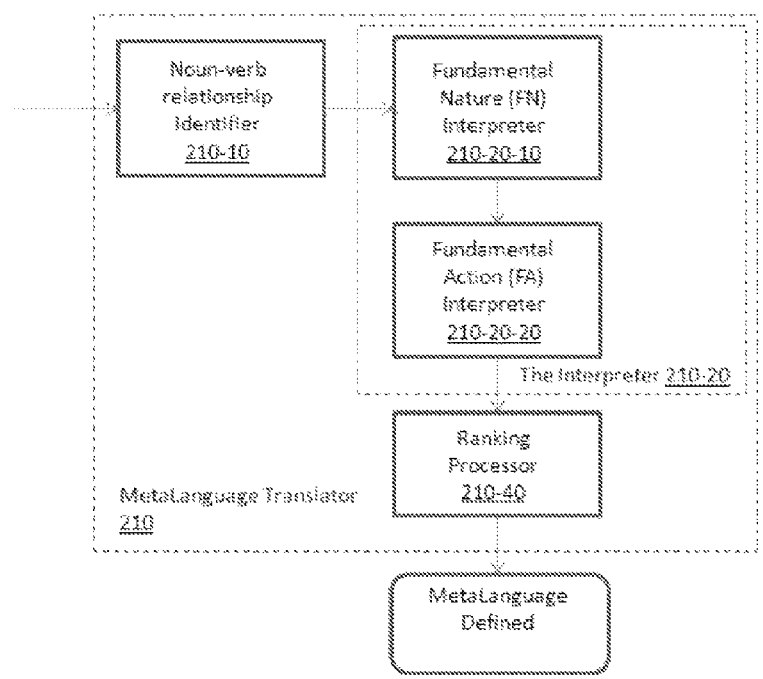
FIG. 10 shows a portion of the system of an exemplary embodiment of the instant invention including the MetaLanguage Translator.

One embodiment of MetaLanguage Translator 210 is shown in FIGS. 9 and 10. A MetaLanguage analysis process is applied to these documents, resulting in key Fundamental Attributes (in the disclosed embodiment of the instant invention we define Fundamental Natures, Fundamental Actions, and Fundamental Qualifiers; however, it will be appreciated that others may also be defined without departing from the spirit and scope of the instant invention) being stored with the documents in a manner that enables these documents and their respective key attributes to be searchable (i.e. a searchable MetaLanguage).

The MetaLanguage Translator is comprised of three predominant subroutines.

First, noun-verb relationship identifier 210-10: This subroutine exploits prior art in the domain of computational linguistics to create noun-verb relationships, qualifiers (attributes) of nouns and verbs and passes these to The Interpreter 210-20.

Second, the Interpreter 210-20: This subroutine interprets the Fundamental nature (FN), Fundamental Action (FA), and Fundamental Qualifiers (FQ) of the FNs and FAs.

Third, the Ranking Processor 210-40: This subroutine ranks the importance of noun-verb-FN-FA-FQ relationships given information about Document Class, FN of the body of documents, and dominant nouns and dominant-noun-verb relationships in the document.

The MetaLanguage Translator is governed by an "Attribute Process". This "Attribute Process" determines the Fundamental Nature and Fundamental Actions for the documents.

In the exemplary embodiment, in which a patent is the document being processed by the MetaLanguage Translator of the instant invention, the Fundamental Nature step of the Attribute Process identifies the number occurrences of: (a) each noun-verb relationship; (b) the associated Fundamental Nature of the noun for each set of noun-verb relationships; (c) in which Section [e.g. Title, Abstract, Claims, Description for a patent, or sentence, page, or entire document for documents in general] of the patent each of these occurs; and (d) a weighting which results in a net determination of the predominant Fundamental Nature(s) for the document and/or section of the document.

There are several ways to define a noun-verb relationship. In the preferred embodiment, one or more existing code libraries of the prior art are used to identify these noun-verb relationships. In some embodiments, particular in those in which an associative memory array is utilized (such as are described in more detail in any of U.S. Pat. Nos. 7,908,438, 7,774,291, 7,565,491, 7,478,192, and 7,478,090, the disclosures of which are incorporated herein by reference in their entireties), the MetaLanguage Translator further identifies in which Section of the document each specific non-verb relationship occurs (in addition to identifying in which Section each Fundamental Nature occurs), the frequency within a Section (or document, in which the entire document is broadly referred to as a "Section"), and provides a weighting for use in similarity analysis and/or pattern recognition.

Fundamental Natures and Thesaurus

The initial proposed 11 Fundamental Natures are discussed above with respect to Table 2. The Thesaurus is stored in a relational database (or associative memory array), which relates those words to the Fundamental Nature. An exemplary embodiment of the Fundamental Nature Thesaurus is discussed above with respect to Table 3. In one embodiment, this Thesaurus is generated from domain 'dictionaries' (i.e. Medical Dictionary for Biology). In another embodiment, this Thesaurus is generated from and/or improved through community development—like the Wikipedia concept.

Fundamental Natures Accounting

The number of occurrences of Fundamental Nature for each phrase within a document is recorded in a relational database (or associative memory array), according to the section in which each is found. In another embodiment, the number of occurrences of each noun-verb relationship within a document (and/or document Section) is recorded within a similar database or associative memory array, according the Section in which each occurrence is found (utilizing methodology and systems such as are described in more detail in any of U.S. Pat. Nos. 7,908,438, 7,774,291, 7,565,491, 7,478,192, and 7,478,090, the disclosures of which are incorporated herein by reference in their entireties).

TABLE 5

Exemplary Fundamental Nature Occurrence

| Patent_NO | Thesaurus | Occurrence | Section |
|---|---|---|---|
| Xxxxxxxx | ELECTRONIC | 1 | TITLE |
| | ELECTRONIC | 2 | ABSTRACT |
| | ELECTRONIC | 20 | CLAIMS |
| | ELECTRONIC | 90 | DESCRIPTION |
| | Semiconductor | 0 | TITLE |
| | Semiconductor | 2 | ABSTRACT |
| | Semiconductor | 10 | CLAIMS |
| | Semiconductor | 5 | DESCRIPTION |
| | Transistor | 0 | TITLE |
| | Transistor | 1 | ABSTRACT |
| | Transistor | 0 | CLAIMS |
| | Transistor | 5 | DESCRIPTION |

The USPTO classification system is a method implemented by the U.S. Patent Office to help logically group patents in a way that is relevant in terms of design or methods. This system has undergone several changes over the past 100 years and continues to involve the USPTO's efforts in updating individual patent classifications.

It is important to note that this classification applies to not only issued patents, but other publication works (e.g. applications), of which these entities are anticipated to greatly exceed granted patents. In a preferred embodiment of the instant invention, the computer control algorithm relates the characterization of above described algorithms (e.g. Fundamental Nature Accounting, Fundamental Action Accounting) to the USPTO classification system for a given patent, to assess the 'distance' of what is arrived at compared to the categories assigned by USPTO. Observing this gap will help to, given the Relevance Process, ascertain patents which have higher likelihoods for cross-industry application, or areas where the control algorithm of the embodiment could help improve the search domain for teams who need to understand where there could be prior art, but wouldn't realize this because of the limitations of the USPTO classification system.

Fundamental Natures Weighting

A weighting is applied to each section of the patent as described above with respect to Table 4. This section weighting is specific to the Fundamental Nature.

A ranking of the Fundamental Natures for the entire document is calculated (by the Ranking Processor) by the number of occurrences and the weighting. And in one embodiment it is normalized according to some measure of the size of the document (i.e. number of words).

TABLE 6

Example of Document XXX_FN

| FN | Occurrence Summary | Final Ranking Score/Summary Weighting | Normalized |
|---|---|---|---|
| ELECTRONIC | 120 | 10.0 | |
| BIOLOGICAL | 100 | 8.0 | |
| MECHANICAL | 3 | 0 | |
| ELECTRICAL | 50 | 1.0 | |
| STRUCTURAL | 2 | 0 | |

TABLE 6-continued

Example of Document XXX_FN

| FN | Occurrence Summary | Final Ranking Score/Summary Weighting | Normalized |
|---|---|---|---|
| FLUID | 51 | 1.0 | |
| THERMODYNAMIC | 54 | 1.0 | |
| CHEMICAL | 1 | 0 | |
| OPTICAL | 1 | 0 | |
| NUCLEAR | 2 | 0 | |

Fundamental Action

In the Exemplary embodiment, for a given patent, this step (determination of Fundamental Action) of the Attribute Process will identify the number occurrences of: (a) each noun-verb relationship; (b) the associated Fundamental Action for each set of noun-verb relationships; (c) in which Section [e.g. Title, Abstract, Claims, Description] of the patent each of these occurs; and (d) a weighting which results in a net determination of the predominant Fundamental Actions for the document.

The initial proposed 10 Fundamental Actions include:

TRANSFORM
MANIPULATE
STOP
START
MOVE
STAY
COMBINE
SEPARATE
IDENTIFY
MEASURE

The Thesaurus is stored in a relational database (or associative memory array), which relates those words to the Fundamental Action, and to a probable set of Fundamental Natures. In embodiments in which the Thesaurus is stored in an associative memory array, the array is used to track the frequency of how all of the terms associated with a Thesaurus may show up in the same document—and the association of that document with a Fundamental Nature.

TABLE 7

Exemplary Fundamental Action Thesaurus

| Fundamental_Action | FA_Thesaurus |
|---|---|
| TRANSFORM | Convert |
| | Change |
| | Alter |

TABLE 7-continued

Exemplary Fundamental Action Thesaurus

| Fundamental_Action | FA_Thesaurus |
|---|---|
| | Switch |
| | Does |
| | Make |

In a preferred embodiment, the table also contains information regarding a year, and an associated likelihood, in which there was a change in the understanding of context of the word, to another Fundamental Nature, and the associated likelihood of that change.

TABLE 8

Exemplary Fundamental Action Thesaurus

| Fundamental_Action | FA_Thesaurus | Probable_Fundamental_Nature |
|---|---|---|
| TRANSFORM | Convert | All, 1965, 0.6, ELECTRIC, 0.4 |
| | Change | All |
| | Alter | All |
| | Switch | All, 1965, 0.6, ELECTRIC, 0.9 |

Fundamental Actions Accounting

The number of occurrences each Fundamental Action for a document being analyzed (in this example a patent) is recorded in a relational database (or associative memory array), according to the section in which they are found.

TABLE 9

Exemplary Fundamental Action Occurrence Table

| Patent_NO | Thesaurus | Occurrence | Section |
|---|---|---|---|
| Xxxxxxxx | TRANSFORM | 1 | TITLE |
| | TRANSFORM | 2 | ABSTRACT |
| | TRANSFORM | 20 | CLAIMS |
| | TRANSFORM | 90 | DESCRIPTION |
| | Convert | 0 | TITLE |
| | Convert | 2 | ABSTRACT |
| | Convert | 10 | CLAIMS |
| | Convert | 5 | DESCRIPTION |
| | Heal | 0 | TITLE |
| | Heal | 1 | ABSTRACT |
| | Heal | 0 | CLAIMS |
| | Heal | 5 | DESCRIPTION |

Fundamental Actions Weighting

In a preferred embodiment, a weighting is applied to each section of the patent as discussed above with respect to Table 4. In one preferred embodiment, the weighting may be applied to the occurrences within each Fundamental Action subset of words. An exemplary total occurrence summary and summary weighting is provided.

TABLE 10

Exemplary Fundamental Action Weighting

| Patent_NO | Thesaurus | Occurrence_Summary | Summary_Weighting | Normalized |
|---|---|---|---|---|
| Xxxxxxxx | TRANSFORM | 120 | 140 | |
| | MANIPULATE | 2 | 0.5 | |
| | STOP | 200 | 400 | |
| | MOVE | 4 | 20 | |
| | HOLD | 20 | 15 | |
| | SEPARATE | 35 | 14 | |
| | IDENTIFY | 10 | 10 | |
| | MEASURE | 0 | 0 | |

Search Input and Parser—110 and 120

Figure 11:
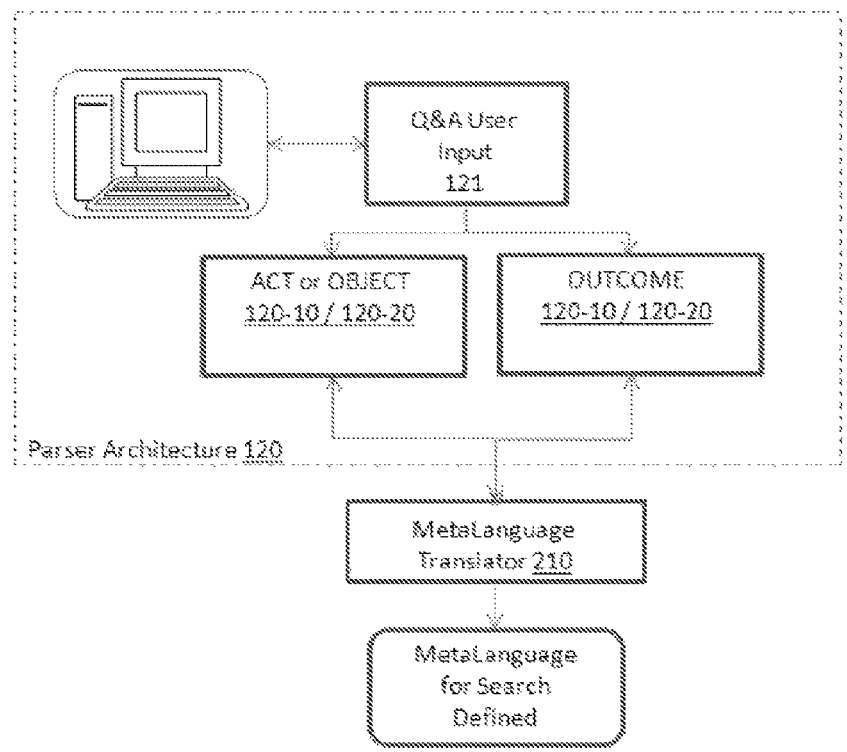
FIG. 11 shows a portion of the system of an exemplary embodiment of the instant invention including the Parser Architecture and the MetaLanguage Translator.

FIG. 11 functionally describes the "Search Input". This input is a natural language input, without necessarily any limitation to the user's description.

The input is parsed, but the parsing is 'forced' upon (i.e. the search query is "guided") the user by having the user input their search according to an "Act" (i.e. what action are they looking for) and an "Outcome" (i.e. what situation or end result are they looking to obtain). For instance, an act may be "I'm looking for a chemical compound or a process which will remove oil stains from garments" . . . and the outcome may be "so that I have clean clothes".

Note that this may produce a very different result than the reverse, which is "I'm looking for a machine and chemical compound to clean my clothes" . . . and the outcome "so that I have oil stains removed from my garments".

There are two key elements to the Search Input mechanism. The first element concerns the differentiation in language between an "ACT" and an "OUTCOME". The second element concerns the interpretation, by the user, of what is the Fundamental Nature of their inquiry.

The Attribute Process, as it pertains to the intended search, simplifies the understanding of the patent/document, through automated discovery of key characteristics of the natural language provided by the searcher and temporarily holds and stores these characteristics for the searcher or passes the search itself back to the Database Server.

ACT and OUTCOME

The User inputs, in natural language, what they are looking for. The invention constrains their input in a way to produce an interpretation about what is an "ACT" vs. what is an "OUTCOME" of what they are looking for in terms of a solution to a problem or a query.

The concerns being addressed are as follows: First, people tend to think in nouns vs. verbs (at least within our Western culture). So for instance, when conducting a search, people tend to think about what it is that they are looking for (i.e. an object and its qualities) vs. the possibilities of the actions that need to be undertaken to produce an outcome. Second, people may not have a philosophical view that forces them to consider the possibility of speaking of ACTS and OUTCOMES vs. about the perceived desired object or solution.

The particular search mechanism deployed with this invention is looking for important noun-verb relationships that are related to what the desired object or process does, vs. (but not in-stead of) the outcome. Therefore, we constrain the natural input language in a way to produce this distinction as it is impossible for a program to ascertain the intent of the user in the absence of guiding the user to consider a clear distinction. This is taken in via the Web Server, and passed on to the Application Server to apply the attribute processing.[12]

[12] This is not trivial because there is a limited space within which the User provides this input. Therefore, a lot of information must be derived in regards to intent, from very little initial data.

The Search Input is stored in the Database Server for future use[13] within the application, and for work to be done with it via the Application Server.

[13] This future use includes the possibility of having a repository of the problems in the market place for which people are looking for solutions.

Example Search Input

We query the User with "I am looking for . . . " and provide two check boxes "an object that" or "a process that" . . . The User inputs: " . . . sits in the body and filters blood before it gets to the heart from clots" [this portion is known as the "ACT"]. We Query "so that" . . . The User inputs: " . . . a person doesn't suffer from a stroke or clots in the lungs causing a loss of circulation or other issues like that." [this portion is known as the "OUTCOME"].

Fundamental Nature of the Inquiry

Secondly, we query the user, with the use of boxes and request that he/she ranks the fundamental nature of the inquiry.

Items can receive equal rankings (i.e. the user could indicated Electronic with a '1' and Biological with a '1', but Thermodynamic with a '2', and the remaining items with no input. (i.e. the user is provided a list of all possible Fundamental Nature, and requested to provide a numerical indication as to how the user would rank the applicability of each Fundamental Nature to the intended query).

Matching Processor—220

A matching process is performed against the database of targeted materials (i.e. journals, intellectual property patents, research papers, etc.) that have already been analyzed with respect to their MetaLanguage (i.e. fundamental attributes (i.e. fundamental natures, fundamental actions and noun-verb relationships)).

When identifying noun, verb and FA relationships, (first step following parsing and analysis of either the ACT or the OUTCOME), how do we know that these noun-verb relationships are adequately described in order to arrive at a suitable matching to a Fundamental Action (FA) or when doing a direct relevancy match against a set of patents? (For instance, the person may or may not know the 'proper' terminology in a cross-disciplinary situation). For example, the person knows the terminology (but we can't necessarily assume that same terminology is used in the body of documents against which we are running the search)

Let's say the user is looking for the following: "I'm looking to convert sunlight using photosynthesis or a similar process, into energy." The ACT is: "Convert sunlight (WHAT) using photosynthesis or a similar process (HOW)". The OUTCOME is: "Energy".

TABLE 11

Verb, Nouns, and Positions

| Verb | Noun |
|---|---|
| Convert | Sunlight |
| Using Sunlight | Process |
| Using Photosynthesis | |

The principle: "A thesaurus is, in a sense, the opposite of a dictionary. You go to a dictionary when you know the word but need the definition. You go to a thesaurus when you know the definition but need the word." p. 159 Writers Inc: A Student Handbook for Writing & Learning.

We constitute what is called a "$1^{st}$ Order Search". The $1^{st}$ Order Search is where we take the verb-noun relationships, and convert into a fundamental action using the thesaurus of the instant invention, and use these ACTUAL relationships to conduct matching against the database.

| Verb | FA | Noun |
|---|---|---|
| Convert | Transform | Sunlight |
| Using | Manipulate | Photosynthesis |
| Using | Manipulate | Process |

We constitute what is called a "$2^{nd}$ Order Search". The $2^{nd}$ Order Search is where we uncover $2^{nd}$ order verb-noun relationships using a dictionary to uncover new verb-noun relationships.

| 2nd Order Noun (SON) | Noun | Dictionary Lookup |
|---|---|---|
| 1 | Sunlight | The light of the sun |
| 2 | Photosynthesis | Synthesis of chemical compounds with the aid of radiant energy and especially light |
| 3 | Process | A natural phenomenon marked by gradual changes that lead to a particular result |

SON 1 [Light]

| Verb | FA | Noun |
|---|---|---|
| Light | Identify | Sun |

SON 2 [Synthesize]

| Verb | FA | Noun | FQ |
|---|---|---|---|
| synthesize | Transform | Compound | |
| Aid | Transform | Energy | Radiant |
| Aid | Transform | Light | |

SON 3 [Process]

| Subject | FQ | Verb | FA | Object | FQ |
|---|---|---|---|---|---|
| Phenomenon | natural | Mark | Identify | Changes | gradual |
| Changes | | Lead | Identify | Result | |

The 2$^{nd}$ Order Search is used to narrow relevancy as follows: Conduct 1$^{st}$ Order Search. Conduct 2$^{nd}$ Order Search on 1$^{st}$ Order Search Results. If on the other hand, 1$^{st}$ Order Search results are too narrow, in a preferred embodiment we use the 2$^{nd}$ Order Search only instead of the 1$^{st}$ Order Search. If neither of these work, the user has the option to go to a 2$^{nd}$ dictionary look-up (i.e. 2$^{nd}$ definition in the dictionary). In this case, for photosynthesis, it would be:

| 2nd Order Noun (SON) | Noun | Dictionary Lookup |
|---|---|---|
| 1 | Sunlight | The light of the sun |
| 2 | Photosynthesis | Formation of carbohydrates from carbon dioxide and a source of hydrogen (as water) in the chlorophyll-containing tissues of plants exposed to light |
| 3 | Process | A natural phenomenon marked by gradual changes that lead to a particular result |

SON 2 [Form]

| Verb | FA | Noun |
|---|---|---|
| Form | Transform | Carbohydrate |
| Form | Transform | Hydrogen |
| Form | Transform | Water |
| Form | Transform | Plants |
| Form | Transform | Light |
| Expose | Identify | Carbohydrate |
| Expose | Identify | Hydrogen |
| Expose | Identify | Water |
| Expose | Identify | Plants |
| Expose | Identify | Light |

Alternatively, instead of using it to narrow relevancy as discussed above, in another embodiment we use the same verb found in the primary search, and substitute the noun 'photosynthesis' for the nouns found in the 2$^{nd}$ order search so that the 1$^{st}$ Order Search Table becomes as follows:

| Verb | FA | Noun | Position | Rank |
|---|---|---|---|---|
| Convert | Transform | Sunlight | 0 | 1 |
| Using | Manipulate | Sunlight | 0 | 1 |
| Using | Manipulate | Photosynthesis [or, Compound, Energy and Light] | 0 | 1 |
| Convert | Transform | Photosynthesis [or, Compound, Energy and Light] | 2 | 2 |
| Using | Manipulate | Process | 4 | 3 |
| Convert | Transform | Process | 6 | 4 |

The matching process then operates as follows: First, matching within FN. Second, identify FN. Third, rank DB by only similar FNs. Fourth, "filter" which acts to open or close relevancy depending on what Rank we are willing to process to i.e., search Rank=DB objects Rank of FA or +−3 Ranks Fifth, sort relevancy by the number of occurrences of corresponding specific noun relationships. Find/include synonyms as it pertains to the nouns but normalize occurrences by the total # of nouns in the DB object (i.e., journal or patent). Sixth, if the 1st order search results are too limited (function of user selection) search alone. If that too is too limiting, then go to a second dictionary look-up on the user input search request. Matching with Preference for Dissimilar FNs.
    A. Look up the FA and sort by similar ranking with an emphasis on ACT (function of user input).
    B. [ ] outcome weighting
    C. [x] ACT 100%
    D. Sort by noun-verb relationships with a preference (i.e., higher ranking) for dissimilar FN.
    E. If the search results are too narrow then include 2$^{nd}$ order search process on the ACT portion of the user search.
    F. If the search results are too wide then do second order search process only.
Validate the effectiveness of the search's results versus the request.

A matching process with a weighting that is set as 100% "Act" results in a search of FA's across all possible FN's. Alternatively, it will be appreciated that a matching process with a weighting that is set at 100% "Outcome" results in a search constrained to a single FN. Depending upon the weighting of "Act" and "Outcome", a particular search query may result in either first searching via FA and then narrowing down via FN, or vice versa, first searching via FN and then narrowing down via FA.

In another embodiment of the instant invention, each noun-verb relationship for a search query is identified and recorded in an associative memory array (such as are described in more detail in any of U.S. Pat. Nos. 7,908,438, 7,774,291, 7,565, 491, 7,478,192, and 7,478,090, the disclosures of which are incorporated herein by reference in their entireties), and noun-verb relationships (as well as FA, FN's and Fundamental Qualifiers) for target documents are also stored in an associative memory array. In such embodiments, the Matching process includes searching the associative memory array to identify documents (or Sections thereof) that includes at least one noun-verb relationship or qualifiers of nouns and verbs associated therewith that are relevant to at least one noun-verb relationship or qualifiers of nouns and verbs of the search query. It will be appreciated, that depending upon the desired outcome of the search, this matching may occur either before or after the FN/FA matching process. If the search intent is to search across multiple technology domains (i.e. across FN's) then the FN/FA matching process is conducted first to narrow the search results, then the noun-verb matching is conducted. Also, as is discussed above, the FN/FA portion of the matching process may be conducted with the FA first then the FN, or with the FN first then the FA, depending upon the search intent.

Results Generator—230

Figure 12:
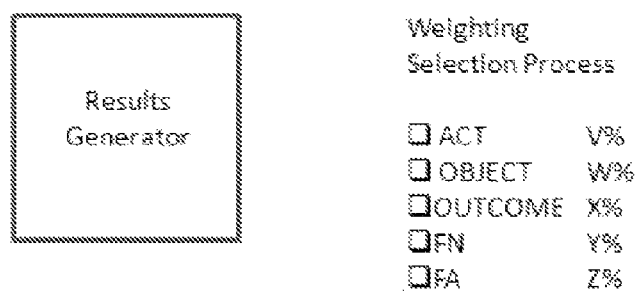
FIG. 12 shows an example of the Results Generator Weighting Selection Process options.

The results of the Matching Processor are ranked by relevancy, according to the preferences set-up by the user and/or already pre-existing preferences. An example of the Results Generator Weighting Selection Process options are shown in greater detail in FIG. 12.

System Trainer—235 and 240

The purpose of the system trainer is two fold: a) short-term, to enable the immediate correction of MetaLanguage or the user's input as result of feedback from the end-user, b) to collect data over-time for statistical analysis and reporting in regards to the suitability of interpretations arrived at with the MetaLanguage.

When results are produced, the system, through the Presentation Layer, will ask the user to assess the validity and relevance of the results. For each result clicked on by the user, the user will have an opportunity to rank relevance on a scale from 1-5 for that particular result. Alternatively (by user selection) the system will provide the user with an opportunity to provide a one-time general feedback in regards to the results.

If the user feedback is deemed marginal (i.e. 3 or less on a scale from 1-5), the system will provide the user with the opportunity to perform a 2nd order search as earlier described, and/or to enhance or expand their initial inputs. Ways in which the system will assist the user, include providing alternative definitions or thesaurus look-up for key nouns or verbs provided (mouse over on key words), or changes to the Fundamental Nature ranking that was initially selected by the user.

Alternatively, depending on permissions set, the system will provide the user with direct visibility to the MetaLanguage and the ability, from a selection of alternatives, to choose alternative Fundamental Actions.

In this way, the 'training' actually operates in both directions: by providing feedback to the user, the system can help to 'train' the user in regards to its use, and by having feedback from the user to the system, statistical analysis can provide longer-term trends as to the reliability of certain 'translations'.

In some embodiments, feedback from the user further includes information about a user's background based on social networks or other data we can arrive at, such as through prior searches, or pattern recognition. In some such embodiments, this feedback is used to help determine the Fundamental Nature or desired outcome of search queries.

The use of Associative Memory Arrays provides several key advantages by way of similarity analysis and pattern recognition (as is described in more detail is any of U.S. Pat. Nos. 7,908,438, 7,774,291, 7,565,491, 7,478,192, and 7,478,090, the disclosures of which are incorporated herein by reference in their entireties). The first is that there are 'counts' of associations that are kept within a set of matrices. The data is pre-connected, pre-associated such that a user can run real-time queries as well as adapting the memory as new information arrives. Associations can be 'weak'—in terms of not having a lot of counts. But the opposite is also true when a searcher is more interested in what is NOT a relationship—in which case one may be looking for sparsely populated matrices.

The use of associative memory arrays drives the prioritization of relevance based initially on a) the frequency of associations represented, and b) the human guided learning.

What happens with this is that there is a very important feedback mechanism. First, we look for intentional feedback from the user. That feedback looks like the user indicated through the user interface which searches were most relevant. We then do pattern matching of the association matrices—looking for what is 'similar' to that pattern amongst the other documents returned as being of possible interest to the user.

Then, we also look for where the user spends the most time (e.g. what pages and/or documents). We rank those as relevant.

The exemplary embodiments of the present general inventive concept are implemented as a software algorithm, e.g., computer readable codes, on a computer readable medium. Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

Various other embodiments of the present general inventive concept can be embodied as computer readable codes on a computer readable medium and/or computer readable recording medium (collectively "computer readable recording medium" hereafter). The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed is:

1. A computer implemented method of semantic based searching comprising the steps of:
   selecting a target set of searchable data items;
   processing each of said data items through a MetaLanguage translator, said translator performing the steps of:
      identifying noun-verb relationships and qualifiers of nouns and verbs contained within each data item; and
      assigning at least one Fundamental Attribute to each of said noun-verb relationships, wherein said Fundamental Attribute is a single abstraction of more than one noun, verb, or qualifier of a noun or verb;
      associating in a computer searchable memory said at least one Fundamental Attribute with the data item to which it relates;
   inputting a search query;
   assigning at least one Fundamental Attribute to said search query; and
   searching said computer searchable memory to identify any data items that include at least one Fundamental Attribute associated therewith that is relevant to said at least one Fundamental Attribute of said search query,
   wherein said at least one Fundamental Attribute within each data item of said search query each includes at least one Fundamental Nature and at least one Fundamental Action, and wherein said searching step further includes the steps of:
      searching first said computer searchable memory to identify any data items that include at least one Fundamental Nature associated therewith that is relevant to said at least one Fundamental Nature of said search query; and
      searching second within a results list of said first searching step said computer searchable memory to identify any data items that include at least one Fundamental Action associated therewith that is relevant to said at least one Fundamental Action of said search query.

2. The method as claimed in claim 1 further comprising the steps of: generating a results list of data items identified in said searching step; and displaying said results list on a graphical user interface.

3. The method as claimed in claim 2 wherein said displaying step further comprising displaying data items selected from said results list on said graphical user interface.

4. The method as claimed in claim 1 wherein said at least one Fundamental Attribute further includes a Fundamental Qualifier.

5. The method as claimed in claim 1 wherein said Fundamental Nature is associated with the noun of each noun-verb relationship.

6. The method as claimed in claim 1 wherein said Fundamental Action is associated with the verb of each noun-verb relationship.

7. The method as claimed in claim 6 wherein said verb comprises a noun functioning as a verb.

8. The method as claimed in claim 1 wherein separate sections of each item of said target set of searchable data items are identified in said identifying step and wherein at least one Fundamental Attribute is assigned to each section of each item in said assigning step.

9. The method as claimed in claim 8 where said separate sections comprise individual sentences within each item.

10. The method as claimed in claim 8 wherein said separate sections comprise individual pages within each item.

11. The method as claimed in claim 8 wherein multiple Fundamental Attributes for a single section of each item are associated together to determine at least one Fundamental Attribute for said section.

12. The method as claimed in claim 1 wherein in said searching step said MetaLanguage translator determines that said at least one Fundamental Attribute associated with a data item is relevant to said at least one Fundamental Attribute of said search query through a ranking process.

13. The method as claimed in claim 12 wherein said ranking process includes a prioritization of relevance based on similarity of said at least one Fundamental Attribute associated with a data item to said at least one Fundamental Attribute of said search query.

14. The method as claimed in claim 13 wherein said prioritization is based upon a frequency of associations between said at least one Fundamental Attribute associated with a data item and said at least one Fundamental Attribute of said search query.

15. The method as claimed in claim 12 wherein said ranking process includes a prioritization of relevance based on pattern recognition.

16. The method as claimed in claim 15 wherein said prioritization is based upon user feedback regarding relevance of items identified in said searching step.

17. The method as claimed in claim 15 wherein said user feedback comprises an indication from a user that an item is relevant.

18. The method as claimed in claim 15 wherein said user feedback comprises a recognition that a user reviewed said item or a portion thereof for a predetermined period of time.

19. The method as claimed in claim 1 wherein said Fundamental Attributes are selected from a computer searchable memory in which each Fundamental Attribute is associated with more than one noun, verb, or qualifier of a noun or verb.

20. The method as claimed in claim 1 wherein in said inputting step, a user is guided into inputting said search query in the form of an act and an outcome desired.

21. The method as claimed in claim 1 wherein in said searching step includes a first order search and a second order search option.

22. The method as claimed in claim 1 further comprising the step of utilizing crowd sourcing to assess the validity and relevance of results of said searching step.

23. The method as claimed in claim 1 wherein said computer searchable memory comprises an associative memory array.

24. The method as claimed in claim 1 wherein said computer searchable memory comprises a database.

25. The method as claimed in claim 1 wherein in said processing step, said translator further performs the steps of:
associating in said computer searchable memory each of said noun-verb relationships and qualifiers of nouns and verbs contained within each data item with the data item to which each of said noun-verb relationships and qualifiers of nouns and verbs contained within each data item relates;
identifying noun-verb relationships and qualifiers of nouns and verbs contained within said search query; and
searching said computer searchable database memory to identify any data items that include at least one noun-verb relationship or qualifiers of nouns and verbs associated therewith that are relevant to at least one of said noun-verb relationships or qualifiers of nouns and verbs of said search query.

26. The method as claimed in claim 25 wherein said step of searching said computer searchable database memory to identify any data items that include at least one noun-verb relationship or qualifiers of nouns and verbs associated therewith that are relevant to at least one of said noun-verb relationships or qualifiers of nouns and verbs of said search query is performed prior to said step of searching said computer searchable memory to identify any data items that include at least one Fundamental Attribute associated therewith that is relevant to said at least one Fundamental Attribute of said search query.

27. The method as claimed in claim 26 wherein said step of searching said computer searchable memory to identify any data items that include at least one Fundamental Attribute associated therewith that is relevant to said at least one Fundamental Attribute of said search query is conducted within a results list of said step of searching said computer searchable database memory to identify any data items that include at least one noun-verb relationship or qualifiers of nouns and verbs associated therewith that are relevant to at least one of said noun-verb relationships or qualifiers of nouns and verbs of said search query.

28. The method as claimed in claim 25 wherein said step of searching said computer searchable memory to identify any data items that include at least one Fundamental Attribute associated therewith that is relevant to said at least one Fundamental Attribute of said search query is performed prior to said step of searching said computer searchable database memory to identify any data items that include at least one noun-verb relationship or qualifiers of nouns and verbs associated therewith that are relevant to at least one of said noun-verb relationships or qualifiers of nouns and verbs of said search query.

29. The method as claimed in claim 28 wherein said step of searching said computer searchable memory to identify any data items that include at least one Fundamental Attribute associated therewith that is relevant to said at least one Fundamental Attribute of said search query is conducted within a results list of said step of searching said computer searchable database memory to identify any data items that include at least one noun-verb relationship or qualifiers of nouns and verbs associated therewith that are relevant to at least one of said noun-verb relationships or qualifiers of nouns and verbs of said search query.

30. A computer implemented method of semantic based searching comprising the steps of:
selecting a target set of searchable data items;
processing each of said data items through a MetaLanguage translator, said translator performing the steps of:
identifying noun-verb relationships and qualifiers of nouns and verbs contained within each data item; and
assigning at least one Fundamental Attribute to each of said noun-verb relationships, wherein said Fundamental Attribute is a single abstraction of more than one noun, verb, or qualifier of a noun or verb;
associating in a computer searchable memory said at least one Fundamental Attribute with the data item to which it relates;
inputting a search query;
assigning at least one Fundamental Attribute to said search query; and
searching said computer searchable memory to identify any data items that include at least one Fundamental Attribute associated therewith that is relevant to said at least one Fundamental Attribute of said search query,
wherein said at least one Fundamental Attribute within each data item of said search query each includes at least one Fundamental Nature and at least one Fundamental Action, and wherein said searching step further includes the steps of:
searching first said computer searchable memory to identify any data items that include at least one Fundamental Action associated therewith that is relevant to said at least one Fundamental Action of said search query; and
searching second within a results list of said first searching step said computer searchable memory to identify any data items that include at least one Fundamental Nature associated therewith that is relevant to said at least one Fundamental Nature of said search query.

31. A computer implemented method of semantic based searching comprising the steps of:
selecting a target set of searchable data items;
processing each of said data items through a MetaLanguage translator, said translator performing the steps of:
identifying noun-verb relationships and qualifiers of nouns and verbs contained within each data item; and
assigning at least one Fundamental Attribute to each of said noun-verb relationships, wherein said Fundamental Attribute is a single abstraction of more than one noun, verb, or qualifier of a noun or verb;
associating in a computer searchable memory said at least one Fundamental Attribute with the data item to which it relates;
inputting a search query;
assigning at least one Fundamental Attribute to said search query; and
searching said computer searchable memory to identify any data items that include at least one Fundamental Attribute associated therewith that is relevant to said at least one Fundamental Attribute of said search query,
wherein in said processing step, said translator further performs the steps of:
associating in said computer searchable memory each of said noun-verb relationships and qualifiers of nouns and verbs contained within each data item with the data item to which each of said noun-verb relationships and qualifiers of nouns and verbs contained within each data item relates;

identifying noun-verb relationships and qualifiers of nouns and verbs contained within said search query; and searching said computer searchable database memory to identify any data items that include at least one noun-verb relationship or qualifiers of nouns and verbs associated therewith that are relevant to at least one of said noun-verb relationships or qualifiers of nouns and verbs of said search query, wherein said step of searching said computer searchable memory to identify any data items that include at least one Fundamental Attribute associated therewith that is relevant to said at least one Fundamental Attribute of said search query is performed prior to said step of searching said computer searchable database memory to identify any data items that include at least one noun-verb relationship or qualifiers of nouns and verbs associated therewith that are relevant to at least one of said noun-verb relationships or qualifiers of nouns and verbs of said search query, wherein said step of searching said computer searchable memory to identify any data items that include at least one Fundamental Attribute associated therewith that is relevant to said at least one Fundamental Attribute of said search query is conducted within a results list of said step of searching said computer searchable database memory to identify any data items that include at least one noun-verb relationship or qualifiers of nouns and verbs associated therewith that are relevant to at least one of said noun-verb relationships or qualifiers of nouns and verbs of said search query.

32. A computer implemented method of semantic based searching comprising the steps of:

selecting a target set of searchable data items;

processing each of said data items through a MetaLanguage translator, said translator performing the steps of:

identifying noun-verb relationships and qualifiers of nouns and verbs contained within each data item; and assigning at least one Fundamental Attribute to each of said noun-verb relationships, wherein said Fundamental Attribute is a single abstraction of more than one noun, verb, or qualifier of a noun or verb;

associating in a computer searchable memory said at least one Fundamental Attribute with the data item to which it relates;

inputting a search query;

assigning at least one Fundamental Attribute to said search query; and searching said computer searchable memory to identify any data items that include at least one Fundamental Attribute associated therewith that is relevant to said at least one Fundamental Attribute of said search query, wherein in said processing step, said translator further performs the steps of:

associating in said computer searchable memory each of said noun-verb relationships and qualifiers of nouns and verbs contained within each data item with the data item to which each of said noun-verb relationships and qualifiers of nouns and verbs contained within each data item relates;

identifying noun-verb relationships and qualifiers of nouns and verbs contained within said search query; and searching said computer searchable database memory to identify any data items that include at least one noun-verb relationship or qualifiers of nouns and verbs associated therewith that are relevant to at least one of said noun-verb relationships or qualifiers of nouns and verbs of said search query, wherein said step of searching said computer searchable database memory to identify any data items that include at least one noun-verb relationship or qualifiers of nouns and verbs associated therewith that are relevant to at least one of said noun-verb relationships or qualifiers of nouns and verbs of said search query is performed prior to said step of searching said computer searchable memory to identify any data items that include at least one Fundamental Attribute associated therewith that is relevant to said at least one Fundamental Attribute of said search query, wherein said step of searching said computer searchable memory to identify any data items that include at least one Fundamental Attribute associated therewith that is relevant to said at least one Fundamental Attribute of said search query is conducted within a results list of said step of searching said computer searchable database memory to identify any data items that include at least one noun-verb relationship or qualifiers of nouns and verbs associated therewith that are relevant to at least one of said noun-verb relationships or qualifiers of nouns and verbs of said search query.

* * * * *